Patented Mar. 23, 1948

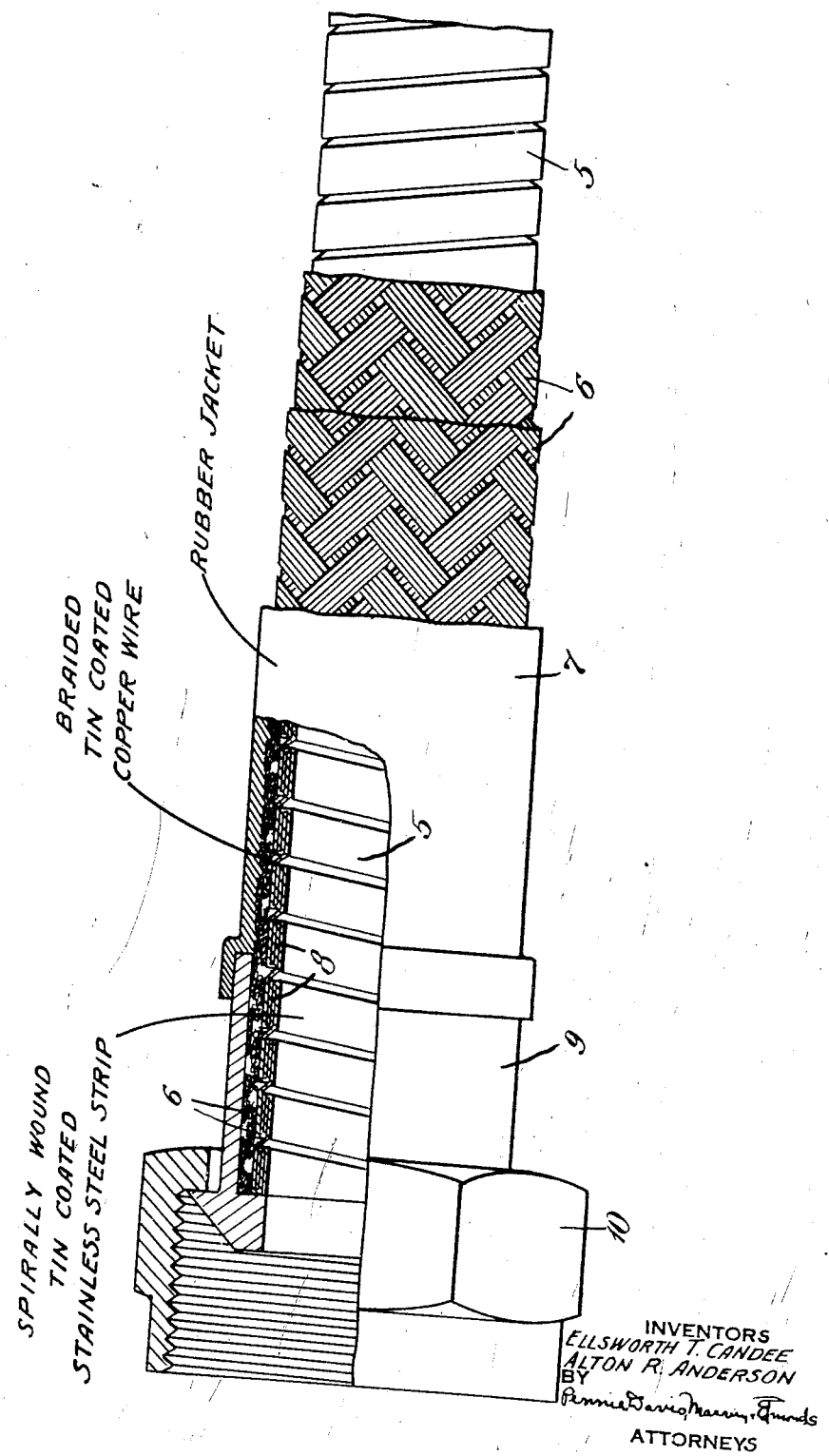

2,438,146

UNITED STATES PATENT OFFICE 2,438,146

FLEXIBLE METAL HOSE

Ellsworth T. Candee and Alton R. Anderson, Waterbury, Conn., assignors to The American Brass Company, a corporation of Connecticut Application June 7, 1945, Serial No. 598,090

3 Claims. (Cl. 174—68)

This invention relates to flexible metal hose suitable for shielding condit and has for its object the provision of certain improvements in such hose.

Flexible metal hose is commonly used as a shielding conduit for electrical conductors which are subjected to varying electrical potentials or carry high frequency or other electric currents capable of producing electric or magnetic fields or electromagnetic radiations which would interfere with the proper functioning of various types of electrical equipment. An outstanding instance of the use of such flexible shielding conduit is on aircraft, where the spark plug leads and other conductors of the ignition system of internal combustion engines are enclosed in the conduit to reduce or prevent interference with radio communication, navigation and similar equipment on the aircraft. As heretofore commonly constructed, flexible shielding conduit has been made up of spirally wound flexible metal hose of the so-called "interlocked," "square-locked" or corrugated types, over which usually has been braided one or more layers of metal wire, and frequently this assembly has had a closely fitting outer protective cover or jacket of natural or synthetic rubber or the like.

We have discovered that the shielding effectiveness of supposedly identical specimens of flexible shielding conduit, particularly of the strip-wound interlocked type, frequently varies widely, and that the effectiveness of a given specimen may vary appreciably with flexing. In an endeavor to discover the causes of these variations we have conducted an extensive investigation of the shielding effectiveness of various combinations of flexible metal hose and braided wire. We have found, for example, marked differences in shielding effectiveness between supposedly identical specimens of braids made of copper, bronze or aluminum wire, and even more marked differences between specimens of supposedly identical interlocked bronze, aluminum or stainless steel flexible metal hose. Moreover, the measured shielding effectiveness of interlocked (uncoated) metal hose was almost always much lower than could be accounted for on a theoretical basis, considering the thickness of the strip of which it was wound. Furthermore, both the individual components and the assembled conduit usually were found to vary appreciably in shielding effectiveness as they were flexed. These observations led us to the view that poor or varying electrical contact, particularly between wires comprising the braid and between convolutions of the strip-wound flexible hose, might be responsible for the variable and relatively low shielding effectiveness generally realized. Consequently we directed our attention to reducing and making more uniform these contact resistances.

Increased tension during braiding and tighter winding of the hose were tried and each was found to be helpful. Believing that the type and condition of the mating metal surfaces might be expected greatly to influence contact resistance, we tried silver plated and tinned copper wire in place of bare copper wire for braids with resulting improvement and greater uniformity in shielding effectiveness. Noting the improvement obtained by so coating copper wire used for braids and because we felt that the potential shielding effectiveness of the flexible metal hose was far from being realized, we tried, in addition, tin-coating stainless steel strip prior to fabricating it into hose and found that the resulting hose was a much improved shield. In particular, successive specimens of this hose were found to have much more uniform shielding effectiveness and the effectiveness of any given specimen varied much less with flexing. We also made up hose of silver coated bronze strip and found it to have excellent and consistent shielding properties. Combining tinned stainless steel hose and tinned copper braid (or braids) we found flexible shielding conduit made thereof possessed vastly superior and more consistent shielding effectiveness than any similar flexible conduit made of interlocked, uncoated stainless steel strip, and bare copper wire braids, theretofore tested by use. We also made flexible conduit of silver coated bronze strip with tin-coated copper wire braids, and found this conduit to have superb shielding properties.

Based on the foregoing discoveries, our present invention, in one of its aspects, involves a flexible metal hose of the strip-wound interlocked type in which the metal strip of which the hose is made is coated with a metal that reduces and makes more uniform the electrical contact resistance between contacting surfaces of the strip. Preferably, the metal hose is surrounded by one or more braided layers of metallic wire also coated with a metal that reduces and makes more uniform the electrical contact resistance between contacting surfaces of the wire. Stainless steel strip is of special advantage for making flexible metal hose for shielding conduit because it possesses good mechanical properties, with freedom from corrosion, and provides of itself a considerable degree of shielding. In accordance with the invention, such shielding is greatly improved by applying a suitable metal coating to the stainless steel strip before forming it into hose. Copper, brass, bronze, aluminum, steel and other metal strip suitably coated with metal may likewise be used in making the flexible hose of the invention. The stainless steel or other metal strip may advantageously be coated with tin, but other metals such, for example, as silver, zinc and cadmium have been found suitable for the purposes of the invention. When the flexible metal hose is surrounded by one or more layers of braided wire, silver or copper wire has been found more effective than certain other metals such as bronze or aluminum, because the relatively high electrical conductivities of silver and copper provide better shielding. Coating of the copper wire prior to braiding with tin, silver, zinc, cadmium or equivalent metal improves the shielding effectiveness by reducing and making more uniform the electrical contact resistance between contacting surfaces of the wire comprising the braid. If, for mechanical or other reasons, it is desired to make the braid of bronze, steel, aluminum or other metal wire, the shielding effectiveness of the braid is improved by coating the wire with tin, silver, zinc, cadmium or the like. Slightly roughened or matte surfaces generally give better electrical contact than smooth surfaces, and the metal coating on the strip of the hose and on the wire of the braid may be lightly etched or otherwise lightly roughened with attendant improvement in the shielding effectiveness of the hose and surrounding braid or braids. The hose or an assembly of hose and braid or braids may advantageously be covered with a jacket of natural or synthetic rubber or the like. Such a cover makes the hose or assembly liquid-and-gas-tight, protects it from abrasion, and the like, and increases its ability to withstand flexing and vibration.

The foregoing and other novel features of the invention will better be understood from the following description taken in conjunction with the single figure of the accompanying drawing which is a plan view, partly in section, of a particular flexible shielding conduit embodying the invention and adapted to enclose a spark plug lead.

The flexible shielding conduit shown in the drawing comprises an inner flexible metal hose 5 covered by two layers 6 of braided wire and an outer protective jacket 7. The hose 5 is made of spirally wound tin-coated stainless steel strip having full four-walled interlocking helical joints 8. The braids 6 are made of tin-coated copper wire and the outer protective jacket 7 is made of natural or synthetic rubber or other suitable material. A brass or other metallic ferrule 9 fits tightly over and is soldered or otherwise suitably secured to the braids and hose at each end of the conduit. Each ferrule carries a cooperating nut 10. The jacket 7 surrounds the outer braid of wire and the inner ends of the ferrules, and may advantageously be extruded on, molded in place, or slipped over the conduit.

In accordance with the invention as illustrated in the drawing, the stainless steel strip is coated with tin and etched, if desired, before being fabricated into the flexible metal hose 5. Similarly, the copper wire is coated with tin and etched, if desired, before being braided upon the hose. The tin coatings are preferably applied by hot dipping, but may be applied by electro-plating or in any other suitable manner. Etching may be effected electrolytically, mechanically, or by dipping in a suitable reagent.

The improvement in shielding effectiveness obtained by suitable metal coating, and etching if desired, of the strip and wire results largely from one or more of three properties. These are: (1) superior electrical conductivity of the coating metal, (2) the inherent properties of certain metals used for coating which, because they are less prone to form poorly conducting films or for other reasons, make them better electrical contact materials, and (3) a slightly roughened surface condition which results in numerous small areas of intimate contact, subjected to relatively high unit pressures, as contrasted to fewer and larger areas of lower unit pressures. Hence, the characteristic metal coating of the invention may be obtained with any metal which can be practically applied as a coating to the strip or wire and which is capable of imparting thereto one, and preferably all, of these properties. Only a relatively thin metal coating is required, such for example as results from the customary present day practices of tin coating by hot dipping or of zinc coating by galvanizing. Generally speaking, the thinness of the coating is limited by practical considerations of its application and its ability to withstand wear in service; as for example flexing of the conduit, and economic considerations usually place a practical limit on the thickness of the coating. The metal coating may be applied to the strip or wire, or both, in any suitable manner, such for example, as hot-dipping, electroplating or the like.

The practical advantages of the improved flexible shielding conduit of the invention may briefly be summarized as follows:

1. *Much better shielding effectiveness.*—The shielding effectiveness of conduit consisting of suitably metal coated (or metal coated and etched) metal strip wound into flexible interlocked hose and of conduit employing such hose and having braid (or braids) made of suitably metal coated (or metal coated and etched) wire has been found to be far superior to that of similar conduit made of the same uncoated metal or metals. The invention provides a flexible shielding conduit with a sufficient factor of safety (above present specifications for shielding effectiveness) to allow for all reasonable mill variations likely to be encountered in production, whereas conduit consisting of hose alone or of hose and braid(s) employing similar bare metals is more difficult or even impossible to produce consistently to the present specifications, which require a considerable degree of shielding effectiveness.

2. *More reproducible.*—The shielding conduit of the invention has been found to possess more consistent shielding effectiveness than similar conduit made of uncoated metals. This is highly desirable from a production point of view and gives assurance that tests made on random samples fairly respresent the behavior of other untested assemblies. Sample tests on conduit made of uncoated metals are not always reliable in this respect.

3. *More consistent with flexing.*—The shielding conduit of the invention has been found to show much less variation in shielding effectiveness with flexing than customarily has been observed in conduit made of uncoated metals.

4. *Less affected by molding or extruding covers.*—The application, by molding, of a protective jacket of rubber, or the like, has been found not to alter the shielding effectiveness of the conduit of the invention as much as in the case of conduit made of uncoated metals. The same advantage holds for extruded covers of rubber or the like.

5. *Easier to solder fittings.*—Ferrules, or similar fittings, which are customarily attached to the ends of lengths of conduit for service applications are advantageously soldered to the braid(s) and hose to ensure good electrical contact. With certain of the proposed coatings for metals, such as tin coated stainless steel and copper, the operation of soldering is facilitated by the coating used and a greater percentage of sound joints is obtained in practice with ordinary precautions.

We claim:

1. A flexible metal hose of the strip-wound interlocked type, suitable for shielding conduit, characterized in that the metal strip of which the hose is made is coated with a metal that reduces the electrical contact resistance between contacting surfaces of the strip and the surface of the metal coating is lightly roughened.

2. A flexible shielding conduit comprising a flexible metal hose of the strip-wound interlocked type over which is braided a layer of metallic wire characterized in that the metal strip of which the hose is made and the metallic wires of the braided layer are coated with a metal that reduces the electrical contact resistance between contacting surfaces of the strip and contacting surfaces of the wires and the surfaces of the metal coatings on the strip and on the wires are lightly roughened.

3. A flexible shielding conduit comprising a flexible stainless steel hose of the strip-wound interlocked type over which is braided a layer of copper wire, characterized in that the stainless steel strip of which the hose is made and the copper wires of the braided layer are coated with a metal that reduces the electrical contact resistance between contacting surfaces of the strip and wires, and the surfaces of the metal coatings on the strip and on the wires are lightly roughened.

ELLSWORTH T. CANDEE.
ALTON R. ANDERSON.

REFERENCES CITED

The following references are of record in the file of this patent:

UNITED STATES PATENTS

| Number | Name | Date |
|---|---|---|
| 925,317 | Eldred | June 15, 1909 |
| 930,896 | Speer | Aug. 10, 1909 |
| 2,028,793 | Mascuch | Jan. 28, 1936 |
| 2,141,290 | Carlson et al. | Dec. 27, 1938 |
| 2,287,134 | Robertson | June 23, 1942 |

FOREIGN PATENTS

| Number | Country | Date |
|---|---|---|
| 261,074 | Great Britain | 1926 |